(12) United States Patent
Reevell (10) Patent No.: US 11,672,052 B2
(45) Date of Patent: Jun. 6, 2023

(54) CARTRIDGE INCLUDING A LIQUID STORAGE PORTION WITH A FLEXIBLE WALL

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 254 days.

(21) Appl. No.: 17/212,318

(22) Filed: Mar. 25, 2021

(65) Prior Publication Data

US 2021/0212173 A1    Jul. 8, 2021

Related U.S. Application Data

(63) Continuation of application No. 15/265,882, filed on Sep. 15, 2016, now Pat. No. 10,973,259, which is a
(Continued)

(30) Foreign Application Priority Data

Sep. 16, 2015 (EP) ..................... 15185541

(51) Int. Cl.
*H05B 3/44* (2006.01)
*A24F 40/42* (2020.01)
(Continued)

(52) U.S. Cl.
CPC ............... *H05B 3/44* (2013.01); *A24F 40/42* (2020.01); *A24F 40/51* (2020.01); *B65D 37/00* (2013.01);
(Continued)

(58) Field of Classification Search
CPC ........ H05B 2203/022; H05B 2203/014; H05B 2203/021; H05B 3/44; H05B 1/0244;
(Continued)

(56) References Cited

U.S. PATENT DOCUMENTS 3,046,788 A    7/1962   Laimins
4,415,886 A *  11/1983  Kyogoku ............. B41J 2/17566
                                                 73/304 C
(Continued)

FOREIGN PATENT DOCUMENTS

CN    102501610 A    6/2012
CN    204519361 U    8/2015
(Continued)

OTHER PUBLICATIONS

European Search Report Application No. 15185541.8 dated Apr. 5, 2016.
(Continued)

*Primary Examiner* — Dana Ross
*Assistant Examiner* — Kuangyue Chen
(74) *Attorney, Agent, or Firm* — Harness, Dickey & Pierce, P.L.C.

(57) ABSTRACT

A cartridge for an aerosol-generating system includes a liquid storage portion configured to store a liquid aerosol-forming substrate. The liquid storage portion includes one or more flexible walls and is configured to change at least one of the shape and the size of the liquid storage portion upon a change of the volume of the liquid aerosol-forming substrate held in the liquid storage portion. The cartridge includes a sensor configured to detect data of a physical property. The data relates to at least one of a corresponding shape and a corresponding size of the liquid storage portion
(Continued)

<trans

Figure 1

(Prior Art)

CARTRIDGE INCLUDING A LIQUID STORAGE PORTION WITH A FLEXIBLE WALL

This is a continuation of U.S. application Ser. No. 15/265,882, filed on Sep. 15, 2016, which is a continuation of and claims priority to PCT/EP2016/070242 filed on Aug. 26, 2016, and further claims priority to EP 15185541.8 filed on Sep. 16, 2015, the contents of each of which are hereby incorporated by reference in their entirety.

BACKGROUND

At least one example embodiment relates to aerosol-generating systems, such as handheld electrically operated vaping systems. At least one example embodiment relates to liquid storage portions used in aerosol-generating systems in which the aerosol-forming substrate is liquid and the liquid is stored in the liquid storage portion.

One type of aerosol-generating system is an electrically operated vaping system. Handheld electrically operated vaping systems may include a device portion comprising a battery and control electronics, a cartridge portion comprising a supply of aerosol-forming substrate held in a liquid storage portion, and an electrically operated vaporizer. A cartridge comprising both a supply of aerosol-forming substrate held in the liquid storage portion and a vaporizer is sometimes referred to as a "cartomizer". The vaporizer comprises a coil of heater wire wound around an elongate wick soaked in the liquid aerosol-forming substrate held in the liquid storage portion. The cartridge portion may also comprise a mouthpiece, which the vapor draws on.

It would be desirable to provide an aerosol-generating system that senses the consumption of aerosol-forming substrate and that determines the amount of aerosol-forming substrate remaining in the liquid storage portion.

WO 2012/085207 A1 discloses an electrically operated aerosol-generating system for receiving an aerosol-forming substrate. The system comprises a liquid storage portion configured to store a liquid aerosol-forming substrate, an electric heater comprising at least one heating element for heating the liquid aerosol-forming substrate, and electric circuitry configured to monitor activation of the electric heater and estimate an amount of liquid aerosol-forming substrate remaining in the liquid storage portion based on the monitored activation.

The monitored activation of the electric heater, for example by counting the number of activations, the activation time, even under consideration of power and temperature, are only rough estimates of the amount of the remaining liquid.

It would be desirable to provide an aerosol-generating system that improves the precision of the determined volume of the remaining liquid.

SUMMARY

At least one example embodiment relates to a cartridge for an aerosol-generating system. The cartridge comprises a liquid storage portion configured to hold a liquid aerosol-forming substrate. The liquid storage portion includes one or more flexible walls and is configured to change at least one of the shape and the size of the liquid storage portion upon a change of the volume of the liquid aerosol-forming substrate held in the liquid storage portion. The cartridge further comprises a sensor configured to detect data of a physical property. The detected data relates to at least one of a corresponding shape and a corresponding size of the liquid storage portion so that the volume of the liquid aerosol-forming substrate held in the liquid storage portion is determinable from the detected data. The cartridge further comprises a vaporizer.

In at least one example embodiment, an aerosol-generating system that comprises the cartridge.

At least one example embodiment relates to a method for measuring data from which a volume of a liquid aerosol-forming substrate held in a liquid storage portion is determinable.

In at least one example embodiment, a method includes providing a liquid storage portion with one or more flexible walls configured to hold the liquid aerosol-forming substrate. The liquid storage portion is configured to change at least one of the shape and the size of the liquid storage portion upon a change of the volume of the liquid aerosol-forming substrate held in the liquid storage portion. The method also includes providing a sensor and a vaporizer. In at least one example embodiment, the method further comprises measuring data of a physical property. The measured data relates to at least one of a corresponding shape and a corresponding size of the liquid storage portion so that the volume of the liquid aerosol-forming substrate held in the liquid storage portion is determinable from the measured data.

In at least one example embodiment, the sensor is capable of measuring data of a physical property from which at least one of a corresponding shape and a corresponding size of the liquid storage portion can be determined. In order to determine the currently available volume of liquid aerosol-forming substrate held in the liquid storage portion, the liquid storage portion is sealed.

In at least one example embodiment, the liquid storage portion comprises an outlet for allowing liquid aerosol-forming substrate to flow from the liquid storage portion to a vaporizer. The cartridge may comprise a housing in which the liquid storage portion and a capillary medium are located. A capillary medium is a material that actively conveys liquid from one end of the material to another. The capillary medium may be oriented in the housing to convey liquid to the vaporizer.

In at least one example embodiment, the cartridge comprises a capillary medium like a wick that draws the liquid aerosol-forming substrate to the vaporizer. In normal operation of an aerosol-generating system comprising the cartridge, the drawing of liquid reduces the volume of liquid aerosol-forming substrate held in the liquid storage portion. Each drawing of liquid aerosol-forming substrate out of the liquid storage portion reduces the pressure in the liquid storage portion. The ambient air balances the pressure and causes a reduction of the volume of the liquid storage portion essentially by the amount of the drawn volume of liquid aerosol-forming substrate.

In at least one example embodiment, the liquid storage portion comprises one or more walls representing a surface of the liquid storage portion under which liquid aerosol-forming substrate may be stored. The liquid storage portion comprises at least one flexible wall. The liquid storage portion may be an entirely flexible container. The liquid storage portion may comprise a first wall, a second wall opposite to the first wall, and side walls extending between the first wall and the second wall. In at least one example embodiment, the one or more of the flexible walls of the liquid storage portion are integrally formed. The liquid storage portion may comprise one or more distinct walls that are attached to each other and that are part of the surface of the liquid storage portion under which liquid aerosol-forming substrate may be stored. The liquid storage portion may comprise one more rigid walls and one or more flexible walls.

In at least one example embodiment, the liquid storage portion comprises a rigid first wall and a rigid second wall opposite to the rigid first wall. The side walls extending between the first wall and the second wall are flexible. This arrangement results in a change of height of the liquid storage portion upon a change of volume of the liquid storage portion. Preferably, the first wall and the second wall are substantially parallel to each other.

In at least one example embodiment, the liquid storage portion comprises a rigid first wall and a flexible second wall opposite to the rigid first wall, with side walls extending between the first wall and the second wall. The side walls may be rigid side walls.

The liquid storage portion may be configured to provide a minimum and/or desired volume below which there is essentially no change in shape or size of the liquid storage portion. This is especially relevant for embodiments of liquid storage portions comprising rigid walls. In at least one example embodiment, volume detection below the minimum volume is not supported.

In at least one example embodiment, the liquid storage portion may have one or more degrees of freedom in the spatial dimensions such that the at least one flexible wall might lead to at least one of modified shape and size of the liquid storage portion when liquid aerosol-forming substrate is added to or removed from the liquid storage portion. The cartridge comprises a sensor that measures data of a physical property. The physical property maintains a relationship to the extent of at least one spatial dimension of the liquid storage portion in which the liquid storage portion has a degree of freedom to change its size. Throughout this specification, any change of size along at least one spatial dimension of the liquid storage portion is considered as a change of shape of the liquid storage portion. In other words, any change of the spatial arrangement of the surface of the liquid storage portion is considered as a change of shape of the liquid storage portion, even if the entire liquid storage is only re-scaled in size with unchanged proportions.

In at least one example embodiment, the liquid storage portion is fixed at two opposite ends to provide a consistent and/or predictable way of flexing between the two ends.

In at least one example embodiment, the liquid storage portion is configured to reversibly and consistently changing its shape and size upon a change of the volume of the liquid aerosol-forming substrate held in the liquid storage portion. This means that the liquid storage portion reverts to the same shape and size after removing and adding the same amount of liquid aerosol-forming substrate, which may be helpful for refillable liquid storage portions.

In at least one example embodiment, at least one sensor component is configured to detect a change of at least one of shape or extent of the flexible wall upon a volume change of the liquid storage portion.

In at least one example embodiment, the sensor measures data of a physical property that is related to a desired (or alternatively predefined) extent of one spatial dimension of the liquid storage portion. No historical measurement data should be needed to be retrieved in order to determine the current volume of the liquid storage portion provided that there is an unambiguous relationship between the extent of the chosen spatial dimension of the liquid storage portion and the volume of the liquid storage portion. In at least one example embodiment, this may be achieved by allowing the liquid storage portion to change its shape only according to the chosen spatial dimension. In some example embodiments, the liquid storage portion may change its shape in further spatial dimensions. In the latter case, a volume determination is only possible under a desired (or alternatively predefined) orientation of the liquid storage portion that accounts for a desired (or alternatively predefined) mapping between extent of a chosen spatial dimension of the liquid storage portion and its volume.

In at least one example embodiment, the sensor may comprise a first sensor component and a second sensor component. At least one of the first sensor component and the second sensor component may be arranged at a wall of the liquid storage portion.

In at least one example embodiment, the components of the sensor are arranged such that they are configured to detect a signal indicative of a change of at least one of the shape and size of the liquid storage portion. The sensor may be arranged such that a change of the volume of the liquid aerosol-forming substrate held in the liquid storage portion causes a change of the distance between the first sensor component and the second sensor component. In this case, the detected physical property depends on the distance of the first sensor component and the second sensor component. In at least one example embodiment, the first sensor component is located at a first wall of the liquid storage portion and the second sensor component is located at a second wall of the liquid storage portion opposite to the first wall. The liquid storage portion comprises flexible side walls extending between the first wall and the second wall. The flexible side walls cause a change of the distance between the first wall and the second wall upon a change of volume of the liquid storage portion.

In at least one example embodiment, the sensor may be an active sensor with a signal generating function and a signal detecting function that is configured to detect a signal generated by the signal generating function. The first sensor component may implement the signal generating function, while the second sensor component may implement the signal detecting function. At least one of the signal generating function and the signal detecting function are arranged such that a change of the volume of the liquid storage portion causes a change of the distance between the signal generating function and the signal detecting function.

In at least one example embodiment, the sensor may be a passive sensor with a signal generating function, a signal altering function that is configured to alter the signal generated by the signal generating function, and a signal detecting function that is configured to detect the signal generated by the signal generating function after being altered by the signal altering function. The first sensor component may implement the signal generating function, the second sensor component may implement the signal detecting function, and a third sensor component may implement the signal altering function.

In at least one example embodiment, the sensor may comprise a strain gauge representing the signal altering function that is arranged at one of the one or more flexible walls. The sensor is configured to measure the electrical resistance of the strain gauge. The measured electrical resistance relates to a corresponding length of the flexible wall where the strain gauge is arranged. A processing unit maps the measured electrical resistance to the length of the flexible wall where the strain gauge is arranged. The length of the flexible wall relates to a corresponding volume of the liquid storage portion so that the volume of the liquid aerosol-forming substrate held in the liquid storage portion is determinable from the measured electrical resistance.

In at least one example embodiment, the sensor comprises a capacitor representing the signal altering function. The capacitor is arranged such that the capacitor changes its capacitance upon a movement of a wall of the liquid storage portion relative to the housing of the liquid storage portion. The sensor is configured to measure the capacitance of the capacitor. A processing unit maps the measured capacitance to the position of the flexible wall relative to the housing of the liquid storage portion. The current position of the flexible wall relates to a corresponding volume of the liquid storage portion so that the volume of the liquid aerosol-forming substrate held in the liquid storage portion is determinable from the measured capacitance.

In at least one example embodiment, the capacitor comprises a first capacitor plate representing a first sensor component and a second capacitor plate representing a second sensor component. Both sensor components together act as a signal altering function which alters an electrical signal applied to the capacitor plates.

In at least one example embodiment, the first capacitor plate may be arranged at a first wall of the liquid storage portion. In at least one example embodiment, the second capacitor plate is arranged at a second wall of the liquid storage portion, the second wall being opposite to the first wall. In at least one example embodiment, the second capacitor plate is attached to the housing of the liquid storage portion.

In at least one example embodiment, the sensor may comprise a permanent magnet representing the signal generating function and a hall probe representing the signal detecting function. The sensor is configured to measure a magnet field strength of the permanent magnet. The permanent magnet and the hall probe are arranged such that a change of the volume of the liquid storage portion relates to a corresponding change of the distance between the permanent magnet and the hall probe. The measured magnetic field strength relates to a corresponding distance between the permanent magnet and the hall probe so that the volume of the liquid aerosol-forming substrate held in the liquid storage portion is determinable from the measured magnetic field strength.

In at least one example embodiment, the sensor may comprise an induction coil representing the signal altering function and a reader representing both the signal generating function and the signal detecting function. The reader is configured to create an alternating electromagnetic field and to measure the impact of the induction coil onto the created electromagnetic field. The induction coil and the reader are arranged such that a change of the volume of the liquid storage portion relates to a corresponding change of the distance between the induction coil and the reader. The measured impact relates to a corresponding distance between the induction coil and the reader so that the volume of the liquid aerosol-forming substrate held in the liquid storage portion is determinable from the measured magnetic field strength.

In at least one example embodiment, the induction coil may be an RFID tag and the reader may be embodied as an RFID reader that is configured to read the RFID tag beside the determination of the distance of the RFID tag. The cartridge may be identified based on the detected RFID tag.

At least one example embodiment relates to an aerosol-generating system with the cartridge. The aerosol-generating system may include electric circuitry connected to the vaporizer and to an electrical power source. The electric circuitry may be configured to monitor the electrical resistance of the vaporizer, and to control the supply of power to the vaporizer dependent on the electrical resistance of the vaporizer.

The electric circuitry may comprise a microprocessor, which may be a programmable microprocessor. The electric circuitry may comprise further electronic components. The electric circuitry may be configured to regulate a supply of power to the vaporizer. Power may be supplied to the vaporizer continuously following activation of the system or may be supplied intermittently, such as on a puff-by-puff basis. The power may be supplied to the vaporizer in the form of pulses of electrical current. Preferably, the vaporizer is a heater assembly comprising an arrangement of filaments.

The aerosol-generating system advantageously comprises a power supply, typically a battery, within the main body of the housing. As an alternative, the power supply may be another form of charge storage device such as a capacitor. The power supply may require recharging and may have a capacity that allows for the storage of enough energy for one or more vaping experiences; for example, the power supply may have sufficient capacity to allow for the continuous generation of aerosol for a period of around six minutes or for a period that is a multiple of six minutes. In another example, the power supply may have sufficient capacity to allow for a desired (or alternatively predetermined) number of puffs or discrete activations of the heater assembly.

A wall of the housing of the cartridge may include at least one semi-open inlet configured to allow ambient air to enter the liquid storage arrangement. The at least one semi-open inlet may be in a wall opposite the vaporizer, such as a bottom wall. The semi-open inlet allows air to enter the cartridge, but substantially prevents air and/or liquid from leaving the cartridge through the semi-open inlet. A semi-open inlet may for example be a semi-permeable membrane, permeable in one direction only for air, but is air- and liquid-tight in the opposite direction. A semi-open inlet may for example also be a one-way valve. The semi-open inlets allow air to pass through the inlet only if specific conditions are met, for example a minimum depression in the cartridge or a volume of air passing through the valve or membrane.

In at least one example embodiment, the aerosol-forming substrate is a substrate configured to release volatile compounds that can form an aerosol. The volatile compounds may be released by heating the aerosol-forming substrate. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenized plant-based material. The aerosol-forming substrate may comprise homogenized tobacco material. The aerosol-forming substrate may comprise at least one aerosol-former. The aerosol-forming substrate may comprise other additives and ingredients, such as flavorants.

The aerosol-generating system may comprise a main unit and a cartridge that is removably coupled to the main unit. The liquid storage portion and the vaporizer are provided in the cartridge and the main unit comprises a power supply. At least one sensor component is located in the cartridge, while remaining sensor components, if there are any, are located in the main unit.

The aerosol-generating system may be an electrically operated vaping system. The aerosol-generating system may be portable. The aerosol-generating system may have a size comparable to a cigar or cigarette. The vaping system may have a total length ranging from about 30 millimeters to about 150 millimeters. The vaping system may have an external diameter ranging from about 5 millimeters to about 30 millimeters.

Features described in relation to one embodiment may equally be applied to other embodiments.

BRIEF DESCRIPTION OF THE DRAWINGS

Embodiments will now be described, by way of example only, with reference to the accompanying drawings, in which.

DETAILED DESCRIPTION

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

Figure 1:
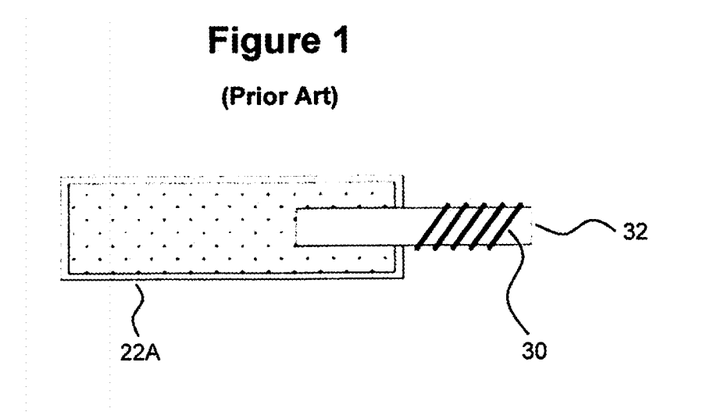
FIG. 1 is a topside view of an aerosol-generating system comprising a liquid storage portion, a capillary medium, and a vaporizer.

In at least one example embodiment, as shown in FIG. 1, an aerosol-generating system comprises a liquid storage portion 22A, a capillary medium 32, and a vaporizer 30. The liquid storage portion 22A has rigid walls that limit the volume of the liquid storage portion 22A. The liquid storage portion 22A is filled with a liquid aerosol-forming substrate that is drawn from the liquid storage portion 22A via the capillary medium 32 extending into the liquid storage portion 22A. The capillary medium 32 is in contact with the vaporizer 30 where the drawn liquid is vaporized. The vaporizer 30 may be a heater assembly comprising, for example, filaments. The vaporizing causes a drawing of liquid aerosol-forming substrate from the liquid storage portion 22A. While the volume of liquid aerosol-forming substrate is decreasing according to the amount of drawn liquid, the volume of the liquid storage portion 22A remains constant due to its rigid walls that limit the volume of the liquid storage portion 22A. The setup of the aerosol-generating system as shown in FIG. 1 is now enhanced according to example embodiments described below.

Figure 2A:
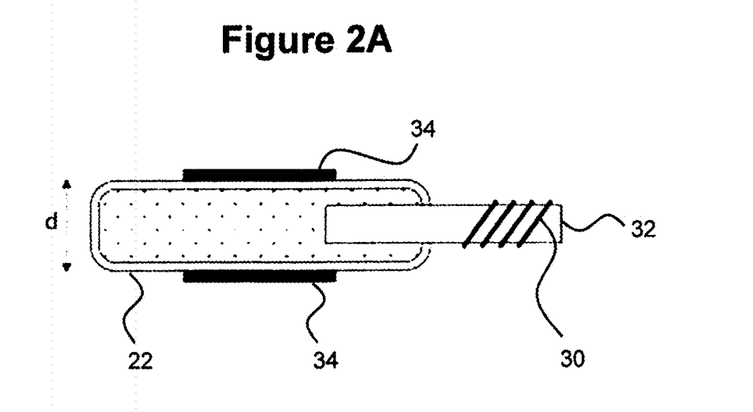
FIG. 2A is a topside view of an aerosol-generating system comprising a liquid storage portion with flexible side walls, a sensor comprising a capacitor, a capillary medium, and a vaporizer, in accordance with at least one example embodiment.

In at least one example embodiment, as shown in FIG. 2A, an aerosol-generating system comprises a liquid storage portion 22 with flexible side walls, a sensor comprising a first sensor component 34 embodied as a capacitor, a capillary medium 32, and a vaporizer 30. A top wall and a bottom wall of the liquid storage portion 22 are rigid, while the side walls extending between the top wall and the bottom wall are flexible. The liquid storage portion 22 is filled with liquid aerosol-forming substrate. The ambient air pressure and a pressure of the liquid aerosol-forming substrate inside the liquid storage portion 22 cause the flexible side walls to move to a corresponding distance d. The capacitor comprises a first capacitor plate located at the top wall and a second capacitor plate located at the bottom wall. The capacitance of the capacitor depends on a distance between the two capacitor plates. Upon decreasing volume of liquid aerosol-forming substrate held in the liquid storage portion 22, the distance d decreases and thus the capacitance of the capacitor increases.

Figure 2B:
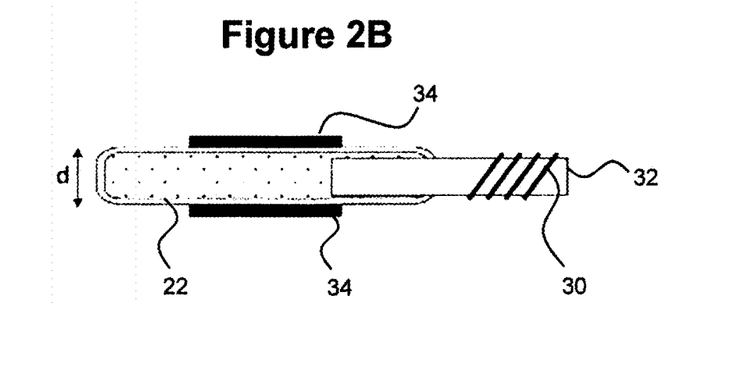
FIG. 2B is a topside view of the aerosol-generating system of FIG. 2A where the volume of liquid aerosol-forming substrate held in the liquid storage portion has been decreased.

In at least one example embodiment, as shown in FIG. 2B, the aerosol-generating system according to FIG. 2A has a lower filling level of liquid aerosol-generating substrate. Therefore, the distance d between top wall and bottom wall has been reduced, as compared to the distance d shown in FIG. 2A. As a result, the distance between the two capacitor plates has also been reduced so that the capacitance of the capacitor has been increased. As there is a relationship between distance d and the capacitance of the capacitor, the distance d between the top wall and the bottom wall of the liquid storage portion 22 may be determined from a measured capacitance of the capacitor. The distance d is proportional to the present volume of the liquid storage portion 22 so that the remaining amount of liquid aerosol-generating substrate may be determined from the measured capacitance of the capacitor.

Figure 3A:
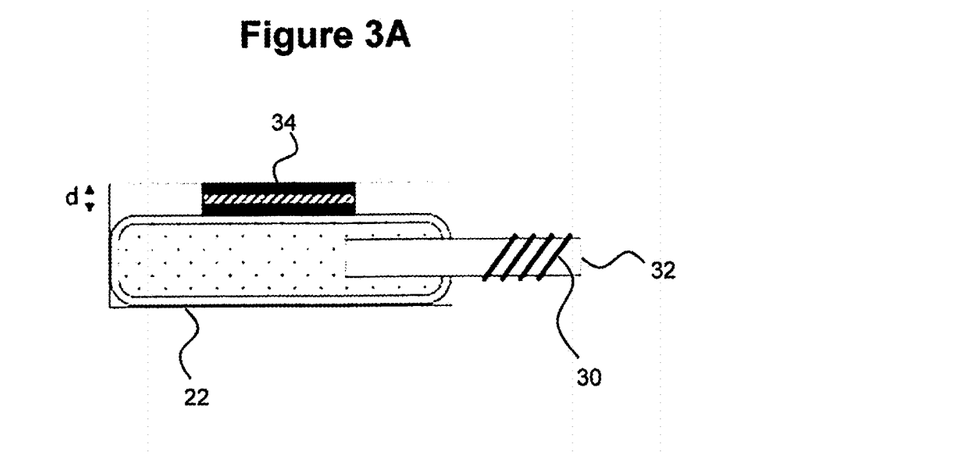
FIG. 3A is a topside view of an aerosol-generating system comprising a liquid storage portion with flexible side walls, a sensor comprising a capacitor, a capillary medium, and a vaporizer, in accordance with at least one example embodiment.

In at least one example embodiment, as shown in FIG. 3A an alternative arrangement of the capacitor as compared to the aerosol-generating system according to FIG. 2A includes the first capacitor plate located at the rigid top wall of the liquid storage portion 22, while the second capacitor plate is located at a top wall of a housing in which the liquid storage portion 22 is mounted. The rigid bottom wall of the liquid storage portion 22 and the top housing wall keep the same distance to each other upon a changing volume of the liquid aerosol-forming substrate held in the liquid storage portion 22. Upon a volume change of the liquid aerosol-forming substrate held in the liquid storage portion 22, the distance d between the top wall of the liquid storage portion 22 and the top housing wall varies. The distance d is a minimum distance when the liquid storage portion 22 is filled with liquid aerosol-forming substrate up to a maximum (or desired) volume, wherein the distance d increases upon a volume decrease of liquid aerosol-forming substrate held in the liquid storage portion 22.

Figure 3B:
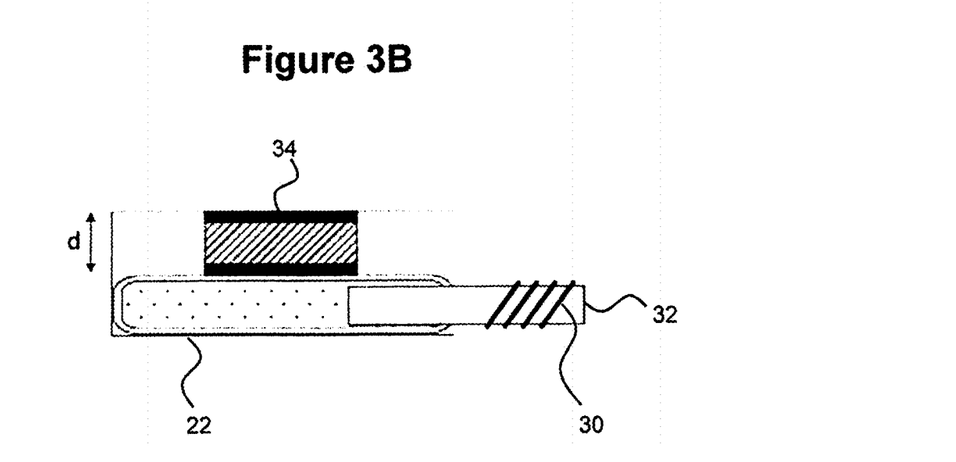
FIG. 3B is a topside view of the aerosol-generating system of FIG. 3A where the volume of liquid aerosol-forming substrate held in the liquid storage portion has been decreased.

In at least one example embodiment, as shown in FIG. 3B, the aerosol-generating system according to FIG. 3A has a lower filling level of liquid aerosol-generating substrate. Therefore, the distance d between the top wall of the liquid storage portion 22 and the top housing wall has been increased, as compared to the distance d shown in FIG. 3A. As a result, the distance between the two capacitor plates has also been increased so that the capacitance of the capacitor has been decreased. As there is a relationship between the distance d and the capacitance of the capacitor, the distance d between the top wall of the liquid storage portion 22 and the top housing wall may be determined from a measured capacitance of the capacitor. The distance d is proportional to the volume of the liquid storage portion 22 so that the remaining amount of liquid aerosol-generating substrate may be determined from the measured capacitance of the capacitor.

Figure 4A:
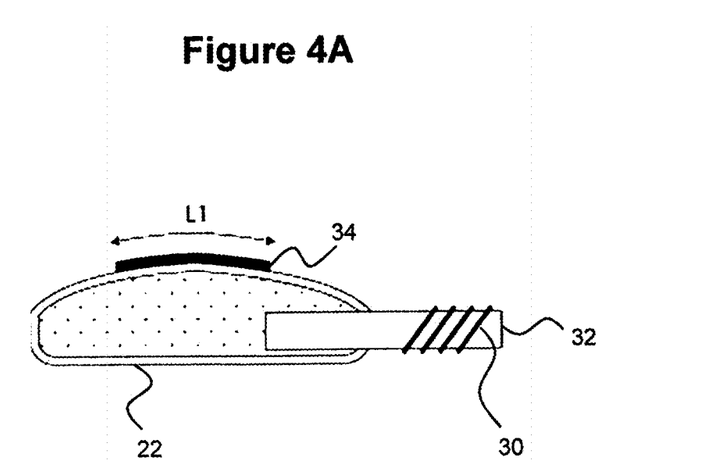
FIG. 4A is a topside view of an aerosol-generating system comprising a liquid storage portion with a flexible top wall, a sensor comprising a strain gauge, a capillary medium, and a vaporizer, in accordance with at least one example embodiment.

In at least one example embodiment, as shown in FIG. 4A, an aerosol-generating system comprises a liquid storage portion 22 with a flexible top wall, a sensor comprising a first sensor component 34 embodied as a strain gauge, a capillary medium 32, and a vaporizer 30. The bottom wall of the liquid storage portion 22 is rigid, while the top wall is flexible. The liquid storage portion 22 is filled with liquid aerosol-forming substrate. The ambient air pressure and the pressure of the liquid aerosol-forming substrate inside the liquid storage portion 22 cause the flexible top wall to vary in length. The strain gauge is mounted on the flexible top wall of the liquid storage portion 22. The electrical resistance of the strain gauge depends on the tension of the top wall in longitudinal direction. Upon decreasing volume of liquid aerosol-forming substrate held in the liquid storage portion 22, the length of the flexible top wall decreases. A decrease of length causes a decrease of tension, thereby resulting in a decreasing electrical resistance of the strain gauge.

Figure 4B:
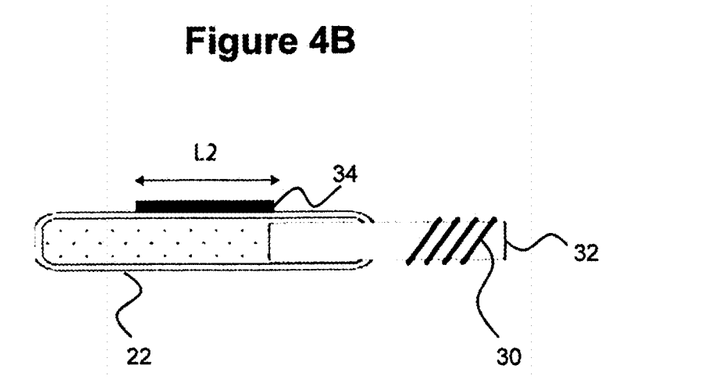
FIG. 4B is a topside view of the aerosol-generating system of FIG. 4A where the volume of liquid aerosol-forming substrate held in the liquid storage portion has been decreased.

In at least one example embodiment, as shown in FIG. 4B, the aerosol-generating system according to FIG. 4A has a lower filling level of liquid aerosol-generating substrate. Therefore, the length of the top wall has been decreased, as compared to the length shown in FIG. 4A. As a result, the tension of the top wall has been decreased so that the electrical resistance of the strain gauge has also been decreased. As there is a relationship between the length and the electrical resistance of the strain gauge, the actual length of the top wall of the liquid storage portion 22 may be determined from a measured electrical resistance. The length of the top wall is proportional to the volume of the liquid storage portion 22 so that the remaining amount of liquid aerosol-generating substrate may be determined from the measured electrical resistance.

Figure 5A:
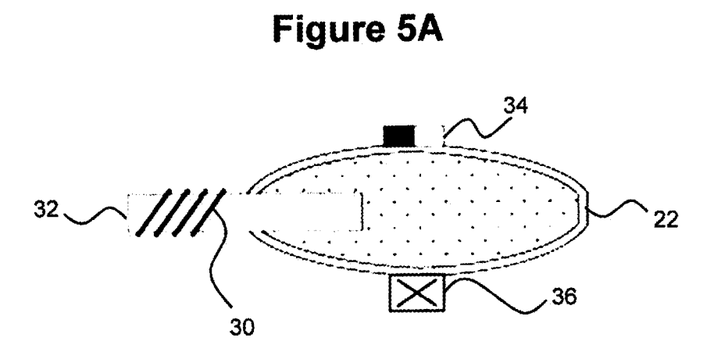
FIG. 5A is a topside view of an aerosol-generating system comprising a liquid storage portion with flexible walls, a sensor comprising a permanent magnet and a hall probe, a capillary medium, and a vaporizer, in accordance with at least one example embodiment.

In at least one example embodiment, as shown in FIG. 5A, an aerosol-generating system comprises a liquid storage portion 22 with flexible walls, a sensor comprising a first sensor component 34 embodied as a permanent magnet and second sensor component 36 embodied as a hall probe, a capillary medium 32, and a vaporizer 30. The permanent magnet is mounted on a first wall of the liquid storage portion 22 and the hall probe is mounted on a second wall of the liquid storage portion. The permanent magnet and the hall probe are located such that, upon constant volume of the liquid storage portion 22, there is substantially no change of distance between the permanent magnet and the hall probe. Due to the flexible walls of the liquid storage portion 22, the distance between the permanent magnet and the hall probe varies upon a changing volume of the liquid storage portion 22. The ambient air pressure and the pressure of the liquid aerosol-forming substrate inside the liquid storage portion 22 cause the flexible side walls to move so that the distance between the permanent magnet and the hall probe changes upon a change of volume. The magnetic field strength detected by the hall probe depends on the distance between the permanent magnet and the hall probe. Upon decreasing volume of liquid aerosol-forming substrate held in the liquid storage portion 22, the distance between the permanent magnet and the hall probe decreases. A decrease of distance causes an increase of magnetic field strength that may be detected by the hall probe.

Figure 5B:
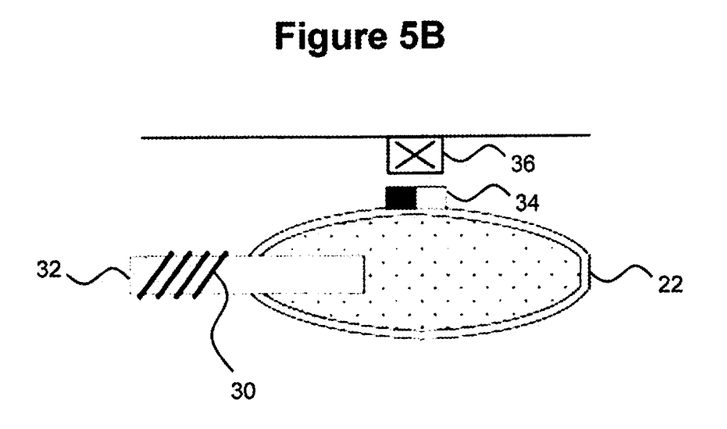
FIG. 5B is a topside view of an aerosol-generating system comprising a liquid storage portion with flexible walls, a sensor comprising a permanent magnet and a hall probe, a capillary medium, and a vaporizer, in accordance with at least one example embodiment.

In at least one example embodiment, as shown in FIG. 5B, an alternative arrangement of the hall probe deviates from the aerosol-generating system shown in FIG. 5A. The permanent magnet is located at the top wall of the liquid storage portion 22, while the hall probe is located at a wall of a housing in which the liquid storage portion 22 is mounted. Upon a volume change of the liquid aerosol-forming substrate held in the liquid storage portion 22, the distance between the top wall of the liquid storage portion 22 and the top housing wall varies. The distance is a minimum distance when the liquid storage portion 22 is filled with liquid aerosol-forming substrate up to a maximum (or desired) volume, wherein the distance increases upon a volume decrease of liquid aerosol-forming substrate held in the liquid storage portion 22.

Figure 5C:
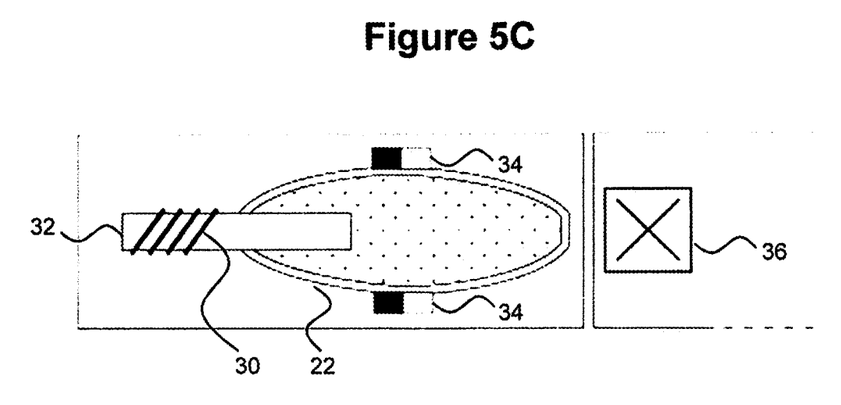
FIG. 5C is a topside view of an aerosol-generating system comprising a liquid storage portion with flexible walls, a sensor comprising a permanent magnet and a hall probe, a capillary medium, and a vaporizer, in accordance with at least one example embodiment.

In at least one example embodiment, as shown in FIG. 5C, an alternative arrangement of the hall probe deviates from the aerosol-generating system shown in FIG. 5A. The permanent magnet is located on a wall of the liquid storage portion 22, while the hall probe is located in a separate housing. The permanent magnet and the hall probe are located such that, upon constant volume of the liquid storage portion 22, there is substantially no change of distance between the permanent magnet and the hall probe. The liquid storage portion with the permanent magnet is part of a cartridge, while the hall probe is part of a main unit of the aerosol-generating system which is distinct from the cartridge. The permanent magnet and the hall probe are arranged such that there is a change of the distance between permanent magnet and hall probe upon a change of the volume of the liquid aerosol-forming substrate held in the liquid storage portion 22. Optionally, at least one further permanent magnet is arranged at a wall of the liquid storage portion, wherein the distance between the further permanent magnet and the hall probe varies upon a change of volume of the liquid storage portion 22.

Figure 6A:
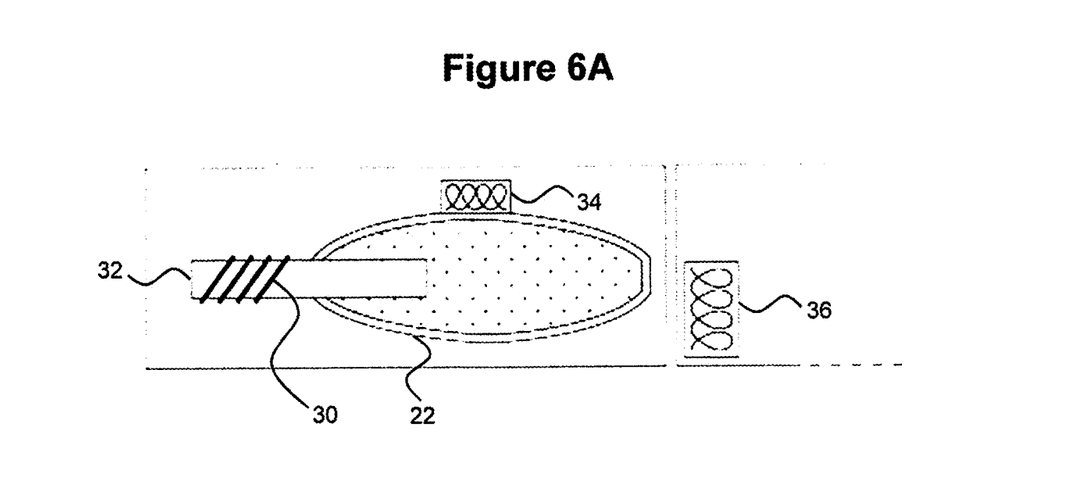
FIG. 6A is a topside view of an aerosol-generating system comprising a liquid storage portion with flexible walls, a sensor comprising an induction coil and a detector, a capillary medium, and a vaporizer, in accordance with at least one example embodiment.

In at least one example embodiment, as shown in FIG. 6A, an aerosol-generating system comprises a liquid storage portion 22 with flexible walls, a sensor comprising a first sensor component 34 embodied as an induction coil, a second sensor component 36 embodied as a detector, a capillary medium 32, and a vaporizer 30. The induction coil is mounted on a wall of the liquid storage portion 22, while the detector is located in a separate housing. The induction coil and the detector are located such that, upon constant volume of the liquid storage portion 22, there is substantially no change of distance between the induction coil and the detector. The liquid storage portion with the induction coil is part of a cartridge, while the detector is part of a main unit of the aerosol-generating system which is distinct from the cartridge. The induction coil and the detector are arranged such that there is a change of the distance between induction coil and detector upon a change of the volume of the liquid aerosol-forming substrate held in the liquid storage portion 22. The detector is configured to create an alternating electromagnetic field and to measure the impact of the induction coil onto the created electromagnetic field. The induction coil and the reader are arranged such that a change of the volume of the liquid storage portion relates to a corresponding change of the distance between the induction coil and the detector. The measured impact may be based on at least one of timing characteristics and signal strength and relates to a corresponding distance between the induction coil and the detector. Optionally, the induction coil may be embodied as an RFID tag and the detector may be embodied as an RFID reader that is configured to read the RFID tag beside the determination of the distance of the RFID tag.

Figure 6B:
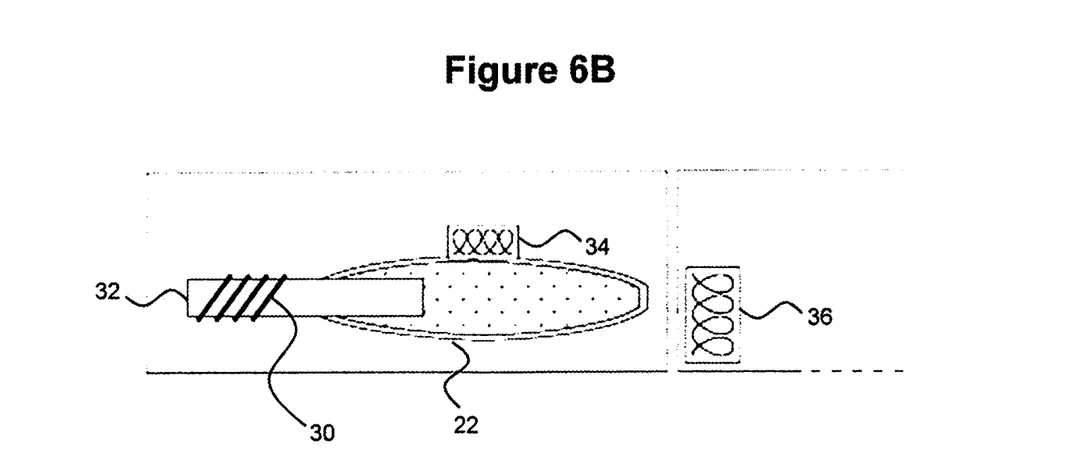
FIG. 6B is a topside view of the aerosol-generating system of FIG. 6A where the volume of liquid aerosol-forming substrate held in the liquid storage portion has been decreased.

In at least one example embodiment, as shown in FIG. 6B, the aerosol-generating system according to FIG. 6A has a lower filling level of liquid aerosol-generating substrate. Therefore, the distance between the induction coil and the detector has been reduced, as compared to the distance shown in FIG. 6A. As there is a relationship between distance and the measured impact of the induction coil onto the alternating electromagnetic field, the distance between the induction coil and the detector may be determined. The distance is proportional to the present volume of the liquid storage portion 22 so that the remaining amount of liquid aerosol-generating substrate may be determined from the measured impact.

Figure 7A:
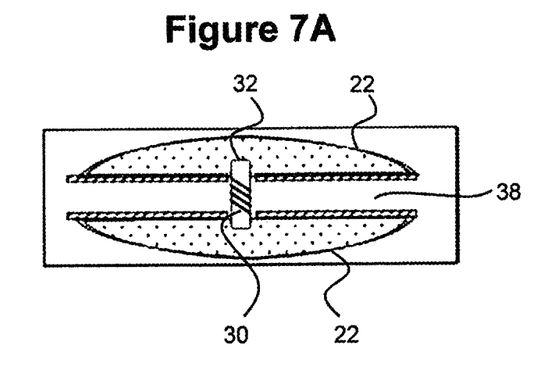
FIG. 7A is a topside view of a cartomizer comprising a liquid storage portion with flexible walls, a sensor, a capillary medium, and a vaporizer, in accordance with at least one example embodiment.

In at least one example embodiment, as shown in FIG. 7A, a cartomizer comprises a liquid storage portion 22 with flexible walls, a sensor (not shown), a capillary medium 32, a vaporizer 30, and a cylindrical air duct 38. The liquid storage portion 22 is arranged around the cylindrical air duct 38 and shows a thickness corresponding to the filling level of the liquid storage portion 22 with liquid aerosol-forming substrate. The wall of the liquid storage portion 22 in contact with the cylindrical air duct 38 may be rigid. The wall of the liquid storage portion 22 to the outside is flexible so that the liquid storage portion changes its shape upon a change of the volume.

Figure 7B:
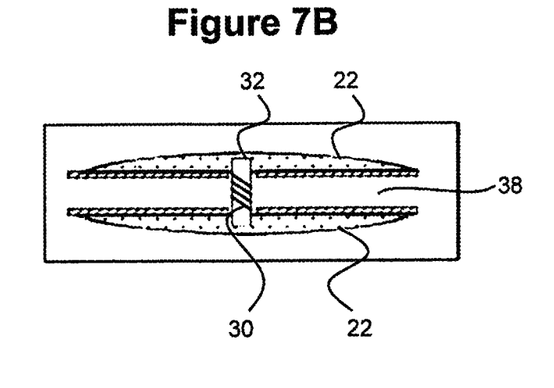
FIG. 7B is a topside view of the cartomizer of FIG. 7A where the volume of liquid aerosol-forming substrate held in the liquid storage portion has been decreased.

In at least one example embodiment, as shown in FIG. 7B, the cartomizer of FIG. 7A has a decreased volume of liquid aerosol-forming substrate held in the liquid storage portion so that the thickness of the liquid storage portion 22 has been decreased.

Figure 8:
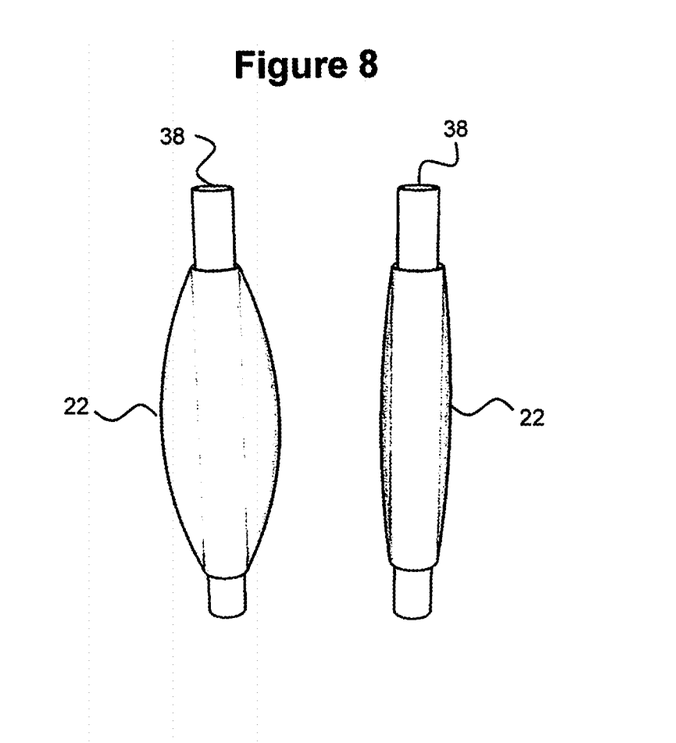
FIG. 8 is a perspective view of the cartomizer of FIGS. 7A and 7B.

FIG. 8 shows the cartomizer of FIGS. 7A and 7B in a perspective view.

Figure 9:
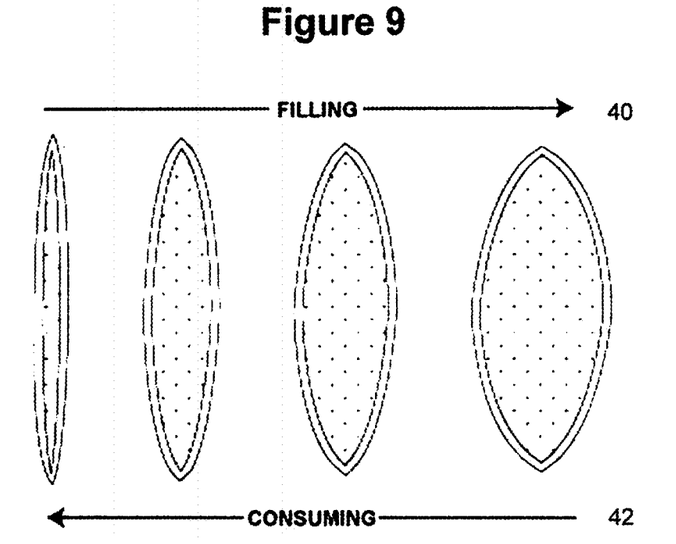
FIG. 9 is a topside view of a liquid storage portion at different filling levels, in accordance with at least one example embodiment.

In at least one example embodiment, as shown in FIG. 9, a liquid storage portion 22 may have different filling levels. The liquid storage portion 22 is fixed at two opposite ends to provide a consistent and predictable flexing between the two ends. Therefore, the liquid storage portion reverts to the same shape and size after consuming 42 and filling 40 the same amount of liquid aerosol-forming substrate, as required for refillable liquid storage portions 22.

Figure 10:
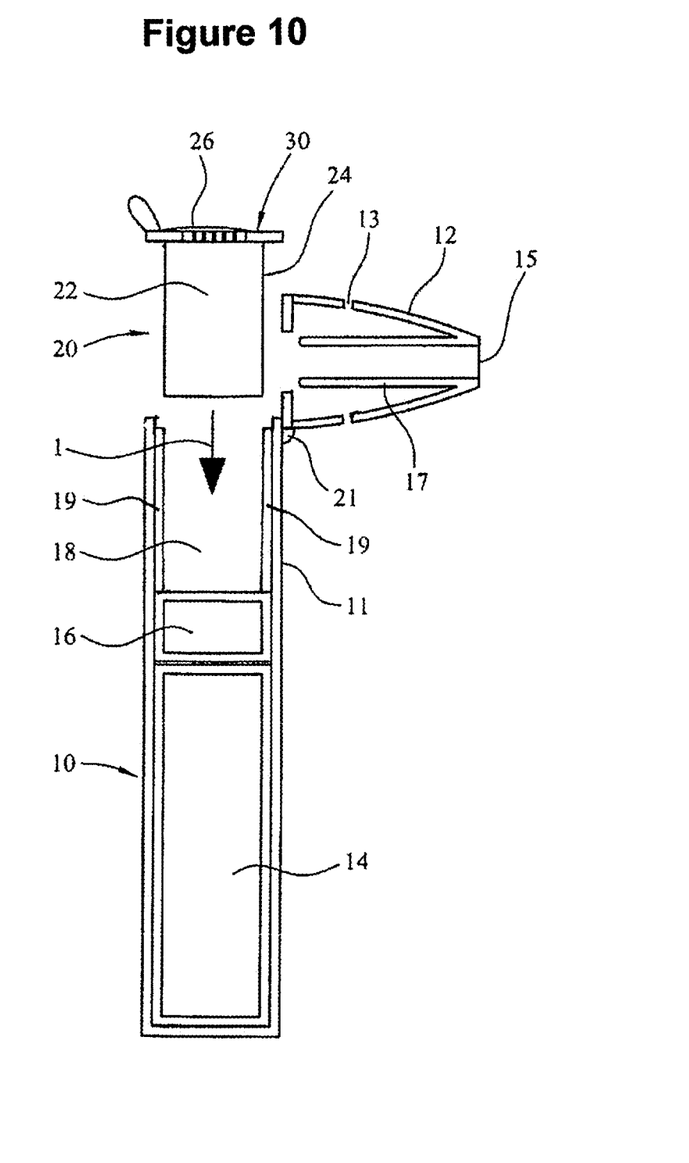
FIG. 10 is a schematic illustration of an aerosol-generating system, incorporating a liquid storage portion with flexible walls, a sensor, a capillary medium, and a vaporizer in accordance with at least one example embodiment.

In at least one example embodiment, as shown in FIG. 10 an aerosol-generating system comprises an aerosol-generating device 10 and a separate cartridge 20. The cartridge 20 comprises a liquid storage portion 22 configured to hold a liquid aerosol-forming substrate. The cartridge 20 further comprises a vaporizer 30 receiving liquid aerosol-forming substrate that is drawn via a capillary medium 32 from the liquid storage portion 22. Furthermore, the cartridge 20 comprises at least one sensor component 34, while remaining sensor components 36, if there are any, may be arranged in the aerosol-generating device 10. In this example, the aerosol-generating system is an electrically operated vaping system.

The cartridge 20 is configured to be received in a cavity 18 within the device. The cartridge 20 may be replaceable by a vapor when the aerosol-forming substrate provided in the cartridge 20 is depleted. FIG. 10 shows the cartridge 20 just prior to insertion into the device, with the arrow 1 in FIG. 10 indicating the direction of insertion of the cartridge 20. The vaporizer 30 and the capillary medium 32 are located in the cartridge 20 behind a cover 26. The aerosol-generating device 10 is portable and has a size comparable to a cigar or a cigarette. The device 10 comprises a main body 11 and a mouthpiece portion 12. The main body 11 contains a power supply 14, for example a battery such as a lithium iron phosphate battery, control electronics 16 and a cavity 18. The mouthpiece portion 12 is connected to the main body 11 by a hinged connection 21 and can move between an open position as shown in FIG. 10 and a closed position. The mouthpiece portion 12 is placed in the open position to allow for insertion and removal of cartridges 20 and is placed in the closed position when the system is to be used to generate aerosol. The mouthpiece portion comprises a plurality of air inlets 13 and an outlet 15. In use, a vapor draws on the outlet to draw air from the air inlets 13, through the mouthpiece portion to the outlet 15. Internal baffles 17 are provided to force the air flowing through the mouthpiece portion 12 past the cartridge.

The cavity 18 has a circular cross-section and is sized to receive a housing 24 of the cartridge 20. Electrical connectors 19 are provided at the sides of the cavity 18 to provide an electrical connection between the control electronics 16 and battery 14 and corresponding electrical contacts on the cartridge 20.

Other cartridge designs incorporating at least one sensor component 34, a vaporizer 30 and a capillary medium 32 can now be conceived by one of ordinary skill in the art. For example, the cartridge 20 may include a mouthpiece portion 12, may include more than one vaporizer and may have any desired shape.

Figure 11:
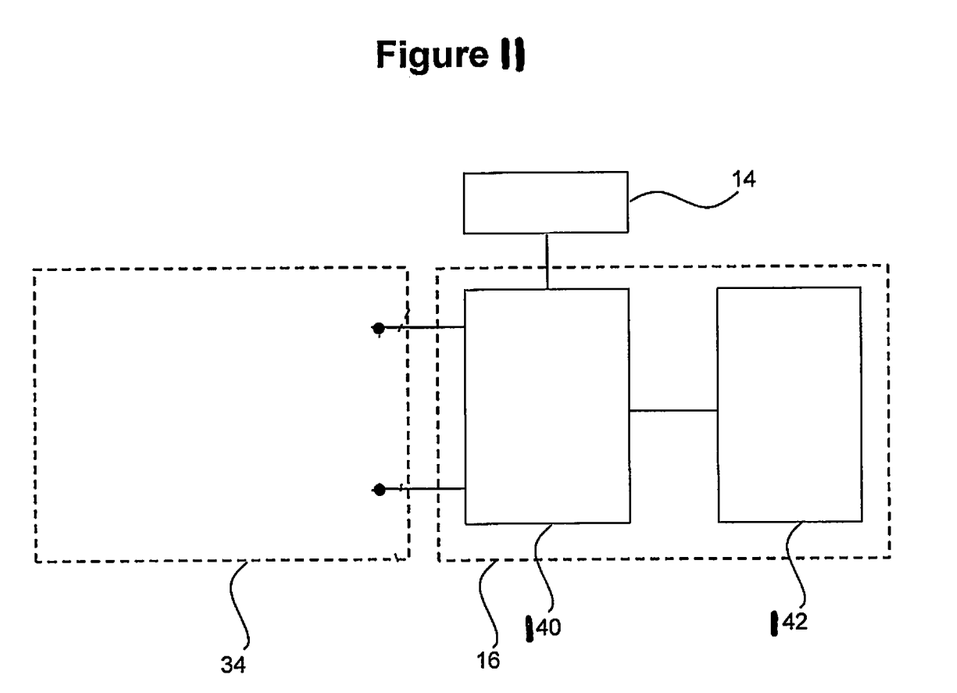
FIG. 11 is a schematic illustration of a sensor and associated control electronics.

In at least one example embodiment, as shown in FIG. 11, the sensor 34 provides a signal to control electronics 16 after an analog-to-digital (ADC) conversion. The control electronics 16 comprises a controller 140 and memory 142. The control electronics 16 are connected to a power supply 14.

The memory 142 stores computer executable code and a look up table. The look up table stores possible sensor outputs and an associated volume of the liquid storage portion for each of the possible sensor outputs. The look-up table is design dependent and maybe prepared based on empirical study and testing. The controller 140 is configured to execute computer executable code to perform the functions of controlling the vaping system such as determining a volume of the liquid storage portion.

For example, during operation, the controller 140 determines a volume of the liquid storage portion by receiving a sensor output from the sensor 34, and retrieving the volume from the look up table based on the sensor output. The volume may be displayed and/or otherwise communicated to an adult vapor.

The exemplary embodiments described above illustrate but are not limiting. In view of the above discussed exemplary embodiments, other embodiments consistent with the above exemplary embodiments will now be apparent to one of ordinary skill in the art.

I claim:

1. A cartridge for an aerosol-generating system comprises:
   a liquid storage portion configured to store a liquid aerosol-forming substrate, the liquid storage portion including,
      one or more rigid walls, and
      one or more flexible walls;
   a sensor configured to detect data of a physical property, the detected data relating to a corresponding shape and a corresponding size of the liquid storage portion; and
   a vaporizer configured to vaporize the liquid aerosol-forming substrate.

2. The cartridge of claim 1, wherein the one or more flexible walls are configured such that the liquid storage portion is configured to change at least one of a shape or a size upon a change of a volume of the liquid aerosol-forming substrate stored in the liquid storage portion.

3. The cartridge of claim 1, wherein the sensor is configured to measure a capacitance value to detect data of the physical property based on the measured capacitance value.

4. The cartridge of claim 1, wherein the one or more flexible walls are configured such that a length of the one or more flexible walls changes upon a change of a volume of the liquid aerosol-forming substrate held in the liquid storage portion.

5. The cartridge of claim 1, wherein the sensor comprises:
   a strain gauge at one of the one or more flexible walls, the sensor configured to detect an electrical resistance of the strain gauge, the detected electrical resistance relating to a corresponding length of the flexible wall adjacent the strain gauge.

6. The cartridge of claim 1, wherein the sensor comprises a first sensor portion and a second sensor portion.

7. The cartridge of claim 6, wherein the first sensor portion, the second sensor portion, or both the first sensor portion and the second sensor portion are at a wall of the liquid storage portion.

8. The cartridge of claim 7, wherein a distance between the first sensor portion and the second sensor portion changes upon a change of a volume of the liquid aerosol-forming substrate stored in the liquid storage portion.

9. The cartridge of claim 8, wherein the sensor is configured to detect data of a physical property that relates to the distance between the first sensor portion and the second sensor portion.

10. The cartridge of claim 6, wherein the one or more rigid walls of the liquid storage portion comprises a first wall, a second wall opposing the first wall, and the one or more flexible walls of the liquid storage portion comprises one or more flexible side walls connecting the first wall with the second wall.

11. The cartridge of claim 10, wherein the first sensor portion is at the first wall and the second sensor portion is at the second wall.

12. The cartridge of claim 11, wherein a distance between the first wall and the second wall changes upon a change of a volume of the liquid aerosol-forming substrate held in the liquid storage portion.

13. The cartridge of claim 11, wherein the sensor is configured to detect the data of a physical property that relates to a corresponding distance between the first wall and the second wall.

14. The cartridge of claim 6, wherein
   the sensor comprises a capacitor, the first sensor portion including a first capacitor plate and the second sensor portion including a second capacitor plate, the sensor configured to measure a capacitance of the capacitor, and
      the measured capacitance corresponds to a distance between a first wall of the one or more rigid walls and a second wall of the one or more rigid walls of the liquid storage portion.

15. The cartridge of claim 6, wherein
   the first sensor portion includes a permanent magnet and the second sensor portion includes a hall probe,
   the sensor is configured to measure magnet field strength of the permanent magnet, and
      the measured magnetic field strength corresponds to a distance between the permanent magnet and the hall probe.

16. The cartridge of claim 6, wherein
   the first sensor portion includes an induction coil and the second sensor portion includes a reader,
   the reader is configured to create an alternating electromagnetic field and measure an impact of the induction coil onto the created electromagnetic field, and
      the measured impact corresponds to a distance between the induction coil and the reader.

17. The cartridge according to claim 6, wherein the first sensor portion includes an RFID tag and the second sensor portion includes an RFID reader configured to read the RFID tag.

18. The cartridge of claim 1, wherein the liquid storage portion is configured to reversibly and consistently change a shape and a size upon a change of a volume of the liquid aerosol-forming substrate stored in the liquid storage portion.

* * * * *